(12) United States Patent
Campbell et al.

(10) Patent No.: US 6,779,054 B2
(45) Date of Patent: Aug. 17, 2004

(54) METHOD AND APPARATUS FOR OPERATING A NETWORK CONTROLLER

(75) Inventors: William B. Campbell, Beaverton, OR (US); Linden Minnick, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 394 days.

(21) Appl. No.: 09/972,698

(22) Filed: Oct. 5, 2001

(65) Prior Publication Data

US 2003/0070010 A1 Apr. 10, 2003

(51) Int. Cl.$^7$ ................................................ G06F 3/00
(52) U.S. Cl. ........................ 710/48; 710/260; 712/220; 709/104
(58) Field of Search ................................ 710/5, 17, 19, 710/36, 46–50, 260, 261, 266, 49–51, 262, 264; 709/104; 712/220

(56) References Cited

U.S. PATENT DOCUMENTS

| | | | | |
|---|---|---|---|---|
| 5,295,246 A | * | 3/1994 | Bischoff et al. | 395/250 |
| 5,732,286 A | * | 3/1998 | Leger | 395/877 |
| 5,881,296 A | * | 3/1999 | Williams et al. | 395/736 |
| 6,085,277 A | * | 7/2000 | Nordstrom et al. | 710/263 |
| 6,401,146 B1 | * | 6/2002 | Lee | 710/53 |
| 6,434,630 B1 | * | 8/2002 | Micalizzi, Jr. et al. | 710/5 |

* cited by examiner

Primary Examiner—Fritz Fleming
Assistant Examiner—RiJue Mai
(74) Attorney, Agent, or Firm—Libby H. Hope; Howard A. Skaist

(57) ABSTRACT

In one embodiment, an apparatus is described. The apparatus includes an input/output (I/O) device that is capable of being coupled to a computing system. The device is configured such that, in operation, the I/O device has the capability to interrupt an associated computing system processor based at least in part on a comparison of a threshold value with the quantity of transmit resources available to the I/O device.

27 Claims, 4 Drawing Sheets

METHOD AND APPARATUS FOR OPERATING A NETWORK CONTROLLER

BACKGROUND

1. Field

This disclosure relates to networking devices and networking device drivers.

2. Background Information

Networks are typically constructed by coupling two or more computers to a data transmission medium, such as category 5 (CAT-5) networking cabling. These computers typically access the transmission medium through an input/output (I/O) device, such as a network interface card (NIC), and, typically, I/O device drivers control I/O devices. I/O devices typically operate within one or more layers of a protocol stack, and typically, a layer has one or more associated peer layers. I/O devices typically have a limited amount of resources available for transmitting data to a network. A need exists for a method to increase the efficiency of transmitting resources of an I/O device.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, and components have not been described in detail so as not to obscure the claimed subject matter.

As is well-known, networks or computer networks comprise a distributed system of intercoupled data links, and typically serve to, at least in part, exchange electronic data. In this context, electronic data refers to one or more bits of digital data. Networks vary in size and speed of data transfer, and are becoming increasingly complex. Networks are typically comprised of one or more computers or computing devices coupled to a transmission medium, which may comprise fiber optic cable, category 5 (CAT-5) networking cabling, wireless media, or any of a number of other types of transmission media. Computers or computing devices coupled to a transmission medium may comprise servers, personal computers, routers, switches, hubs, or any number of other types of networking or computing platforms. These computing platforms typically access the transmission medium through an input/output (I/O) device such as, for example, a network interface card (NIC) or LAN on motherboard (LOM). In this context, I/O devices may comprise any device capable of routing, switching, repeating or passing electronic data to a network. In one embodiment, for example, an I/O device may comprise a network transmitter and receiver, and an I/O controller. Electronic data is typically exchanged, at least in part, by using one or more types of data protocols, such as, for example, a multi-layered packet-based protocol such as the Ethernet protocol. The Ethernet protocol is defined in the Institute for Electrical and Electronics Engineers standard 802.3, 2000 edition, available from IEEE standards, 445 Hoes Lane, P.O. Box 1331, Piscataway, N.J., 08855-1331. Additional information can be found on the World Wide Web at the following URL: http://www.ieee.org. In this context, the term computing device or platform refers to any hardware and/or software based system that includes the capability to perform logic and/or arithmetic operations. It includes, without limitation, personal computers, laptop computers, servers, set-top boxes, hand-held devices, and numerous other types of systems. Additionally, there are several different types of networks, including Wide Area Networks (WAN) and Local Area Networks (LAN), to cite two possible examples.

Figure 3:
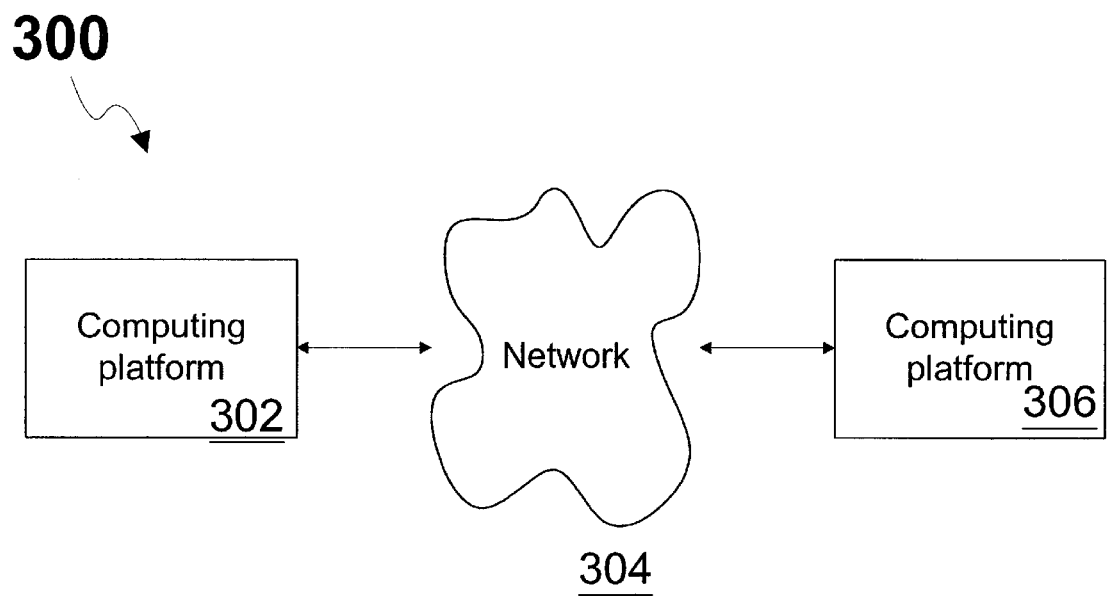
FIG. 3 is a schematic diagram of a network.

FIG. 3 illustrates an embodiment of a simple network or computer network 300. Network 300 comprises a computing platform 302 and a computing platform 306, which may be any of a number of types of computing platform, as explained previously. The two computing platforms are coupled via a transmission medium to network 304, and the transmission medium may be any one of a number of types of transmission media, as explained previously. Computing platforms 302 and 306 may be coupled to network 304 by a network interface such as an NIC, although any type of I/O device may be used to couple the computing platforms 302 and 306 to the transmission medium, as explained previously. Data may be transferred, in this embodiment, between 302 and 306, using a protocol such as the Ethernet protocol. It will, of course, be understood that the computer network 300 described herein is just one embodiment, and the claimed subject matter is not limited to just this particular type of network.

As explained previously, computing platforms coupled to a transmission medium are typically coupled through an input/output (I/O) device, such as a network interface card (NIC), although the claimed subject matter is not limited in this respect. There are many types and categories of NICs, and the claimed subject matter is not limited to any particular type of NIC or I/O device. One such NIC may comprise an Ethernet Media Access Controller (MAC), such as an Intel® PRO/1000 T Server Adapter, to cite one possible example. I/O devices, such as the example provided, may manage data transfer between a computer or computing platform and a network, using, in one such situation, a media access control protocol. There are many versions of media access control protocols, including Ethernet and Gigabit Ethernet, which, as is well known, relate to a 10 and 1000 Megabits per second (Mb/s) rate of electronic data transfer, respectively. The Gigabit Ethernet protocol is specified in the institute of Electrical and Electronics Engineers (IEEE) standard 802.3z-1998, and for data transfer over CAT-5 cable, as specified in IEEE standard 802.3ab-1999. Details regarding this protocol can be obtained from IEEE Standards, 445 Hoes Lane, P.O. Box 1331, Piscataway, N.J. 08855-1331. Additional information can be found on the World Wide Web at the following URL: http://www.gigabit-ethernet.org. It will, of course, be understood that the claimed subject matter is not limited to any particular type of protocol or network protocol.

I/O devices, such as the type previously described, typically operate by utilizing a device driver, although the claimed subject matter is not limited in this respect. In one embodiment, a device driver comprises a software program that at least partially provides commands to the I/O device and manages the operation of the I/O device and how the I/O device interacts with other components or systems, such as those coupled to a network. One particular type of device driver protocol operates within a Network Device Interface Specification (NDIS) layer, developed by Microsoft® Corporation. However, the claimed subject matter is not limited to any particular type of device driver protocol. Information regarding the NDIS specification can be obtained from the World Wide Web at the following URL: http://msdn.Microsoft.com.

In operation, I/O devices may utilize transmit resources when transferring electronic data between a computing platform and a network. Transmit resources may comprise, for example, pointers to particular memory locations on an associated computing platform, or a list of physical memory addresses of one or more fragments of electronic data that are to be at least partially transferred to an associated network, although the claimed subject matter is not limited in this respect. A fragment of electronic data, in this context, comprises a contiguous sequence of digital data pulses. In one embodiment, one particular category of transmit resources are referred to as descriptors. Typically, if an I/O device incorporates descriptors, an I/O device will have a limited number of descriptors associated with it or available to it. Typically, the associated descriptors describe or point to fragments of data stored on a computing platform, or may describe or point to memory buffer locations which may contain one or more data fragments. Typically, descriptors are utilized to describe memory locations as stated previously, and when the data described is transferred to a network, the descriptors may be written over with other information relating to a subsequent data transfer. Transmit resources are typically managed by an I/O device driver, and, in this context, managed refers to the allocation and use of transmit resources in the process of transferring electronic data across an associated network, as described in more detail later.

Figure 1:
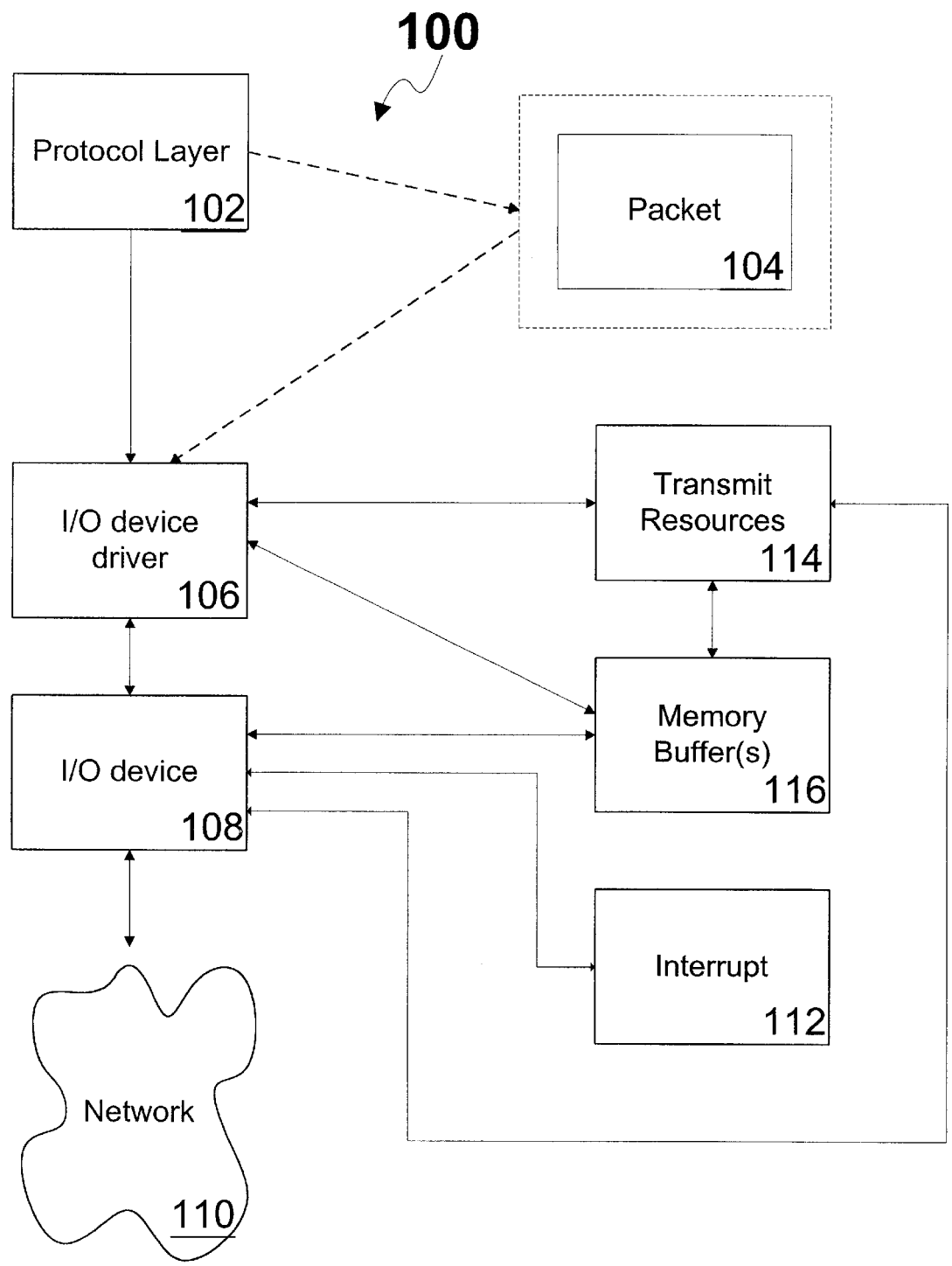
FIG. 1 is a schematic diagram illustrating one embodiment of a network interface card process flow.

FIG. 1 is a schematic diagram illustrating one embodiment of a particular process flow of an I/O device, although other process flows are, of course, possible within the scope of the claimed subject matter. 100 is a process flow diagram illustrating a data transfer flow between a computing platform and a network 110. 102 in this embodiment comprises software operating within a protocol layer, which, as described previously, may comprise software operating within a network device protocol that may be used in accordance with one embodiment of the claimed subject matter. In this particular embodiment, device driver 106 may receive a request to transfer data across a network. This request may be sent by software 102, although the claimed subject matter is not limited in this respect. The device driver 106 may instruct the software operating within a protocol layer 102 to generate at least one data packet 104. The at least one data packet 104, in this embodiment, may comprise a list of memory locations or physical addresses where data may reside on a computing platform, where the data at least partially comprises the data that is to be transferred across a network. The data packet 104 may comprise additional data such as transmit or control information such as which fragment of electronic data is the last fragment of electronic data comprising a packet, although the claimed subject matter is not limited in this respect. When the at least one data packet 104 has at least partially been generated, the data packet may at least partially be passed to device driver 106.

Device driver 106 may subsequently prepare one or more transmit resources, 114, which may comprise a list of the locations in memory or physical addresses that contain data that is to be transferred across a network, as may be indicated by the data packet. In this context, prepared refers to the defining or listing within the transmit resources at least a portion of the data contained within the data packet 104. At some period of time after the device driver 106 has substantially prepared one or more transmit resources, the device driver 106 may notify I/O device 108 that the one or more transmit resources are ready, or substantially ready. Notification may be performed in a number of ways, such as the device driver providing signals back to the I/O device, although the claimed subject matter is not limited in this respect. I/O device 108 may, at some period of time after the notification that the one or more transmit resources are ready, or substantially ready, transfer at least a portion of the data identified by the transmit resources, 114, to the memory of the I/O device 108. The I/O device 108 may generate an interrupt of the computing platform processor to allow processing of the data transfer, although the claimed subject matter is not limited in this respect. I/O device 108 may then, at some period of time after transferring the data identified by the transmit resources from memory buffers 116 to the memory of I/O device 108, transfer at least a portion of the data identified by the transmit resources to a network 110. Again, I/O device 108 may generate an interrupt of the computing platform processor, although the claimed subject matter is not limited in this respect. In embodiments of the claimed subject matter, interrupt 112 may be generated after the transfer of a certain amount of data, a certain number of packets, after a particular period of time, or by the occurrence of other types of events, described in more detail later. At some period of time after interrupt 112 is generated, device driver 106 may access the transmit resources 114. Device driver 106 may determine if I/O device 108 completed the data packet transfer to the network 110 by determining if the I/O device provided signals, such as a 'done' bit, back to the transmit resources 114 If I/O device 108 does indicate to transmit resources 114 that the data packet transfer was substantially complete or completed, then at least a portion of the transmit resources may be available for additional data transfer by the I/O device, and typically, the transmit resources may be written over with other information for subsequent data transfers. Of course, it will be understood that this is just one particular embodiment, and the claimed subject matter is not limited to just this particular example. Additionally, the claimed subject matter may be applicable to any I/O device that uses any type of interrupt moderation. Interrupt moderation, in this context, refers to a method of performing or deferring interrupts, typically based on criteria such as processor usage or desired data transfer rates.

It is not always desirable for an I/O device to generate an interrupt of an associated computing platform processor each time data is transferred to the I/O device, because this may reduce the amount of processing performed, and result in slower processing rates for the computing platform, for example. It may be desirable to coalesce, or gather together, a particular number of tasks, or fragments of electronic data that are to be processed, or passed to a network, so that they may be processed or transferred using one interrupt and, therefore, potentially increase processing rates for an associated computing platform. Coalescing, in this context, refers to the gathering together into a single memory location one or more data fragments, which may be presently located in different memory locations. In one embodiment of the claimed subject matter, a transmit delay timer may be incorporated when data is being transferred to the I/O device for transmission across a network. In this embodiment, a transmit delay timer refers to delaying the generation of an interrupt for a particular period of time after transmit resources are prepared by the device driver. In this embodiment, if additional transmit resources are prepared by the device driver prior to the timer expiring, or reaching a particular measure of time, the timer will be reset. If the timer expires, or reaches a particular measure of time prior to the preparation of additional transmit resources by the device driver, an interrupt will be generated, and the processor of an associated computing platform will be interrupted by the I/O device so that control of transmit resources may be provided to the device driver, as explained previously. However, this method of transmit delay timing may result in the consumption of transmit resources prior to the I/O device interrupting the host processor, as there are typically a limited number of transmit resources available for pointing to memory locations, and if an interrupt does not occur periodically, data may not be transferred, and transmit resources may not be reset and made available for subsequent data transfers. In this context, consumed refers to the use of substantially all transmit resources as memory locators. In this particular situation, the I/O device will typically have to wait for the expiration of the transmit delay timer before generating an interrupt, which may result in a decrease in overall data transfer efficiency, since no processing is typically being performed while the transmit delay timer is counting down to expiration. This condition of substantially all transmit resources being assigned prior to a processor interrupt is generated by a I/O device may be referred to as an out of resource condition.

In one embodiment, a method and/or apparatus for operating a network controller may use a transmit delay timer and a threshold value comparison when transmit resources are being prepared for use in data transmission across a network. As stated previously, transmit delay timers typically reset when additional transmit resources are prepared by the device driver. As was explained however, this may result in an out of resource condition if all transmit resources have been consumed prior to the expiration of a transmit delay timer. In this embodiment, if a particular number of transmit resources are in use before the associated transmit delay timer expires or reaches a particular measure of time, the transmit delay timer will be allowed to expire, and will not be reset by the driver preparing additional transmit resources. The particular number of transmit resources may be referred to as a threshold value in this embodiment, and may be determined by a user, by the I/O device driver, or by any number of other methods, although the claimed subject matter is not limited to any particular method of determining a threshold value. The threshold value may be established by determining the number of transmit resources available to a particular I/O device, and then establishing some percentage of transmit resources that shall be consumed before the transmit delay timer is allowed to expire. For example, if there are X number of transmit resources available, and a data threshold is set at 80% of transmit resources, once 0.8X of the transmit resources are consumed, an associated transmit delay timer will be allowed to expire, and will not be reset by the driver preparing additional transmit resources. In this example, X may represent values for measuring transmit resources, such as bytes of memory, although the claimed subject matter is not limited to just this type of value. Alternatively, the threshold value may be based in part on traffic patterns. Traffic patterns, in this context, refers to the data transfer rate across an associated network, measured over a particular period of time. Traffic patterns may be determined in many well known methods, in accordance with the claimed subject matter. The threshold value may additionally be determined by a user through a user interface, in accordance with one embodiment of the claimed subject matter. There are a number of methods for determining a threshold that will be in accordance with the claimed subject matter, and the claimed subject matter is not limited to any particular method of setting or determining a threshold value.

In this particular embodiment, when transmit resources are prepared, an associated device driver may compare the quantity of transmit resources available, or transmit resources not yet prepared, to a threshold value. If the number of transmit resources available is greater than or equal to the threshold value, an associated transmit delay timer may be reset. If, however, the number of transmit resources is less than the threshold value, the transmit delay timer may be allowed to expire, and may not be reset upon the preparation of additional transmit resources. It will, of course, be understood that this is just one particular embodiment, and the claimed subject matter is not limited in this respect. For example, an associated device driver may compare the number of transmit resources consumed to a threshold value, or may only compare the number of transmit resources available or consumed to a data threshold every other time transmit resources are prepared, or after a particular number of transmit resources are prepared. Additionally, the transmit delay timer may be reset if the number of transmit resources available is greater than a threshold value or within a specified range.

Figure 2:
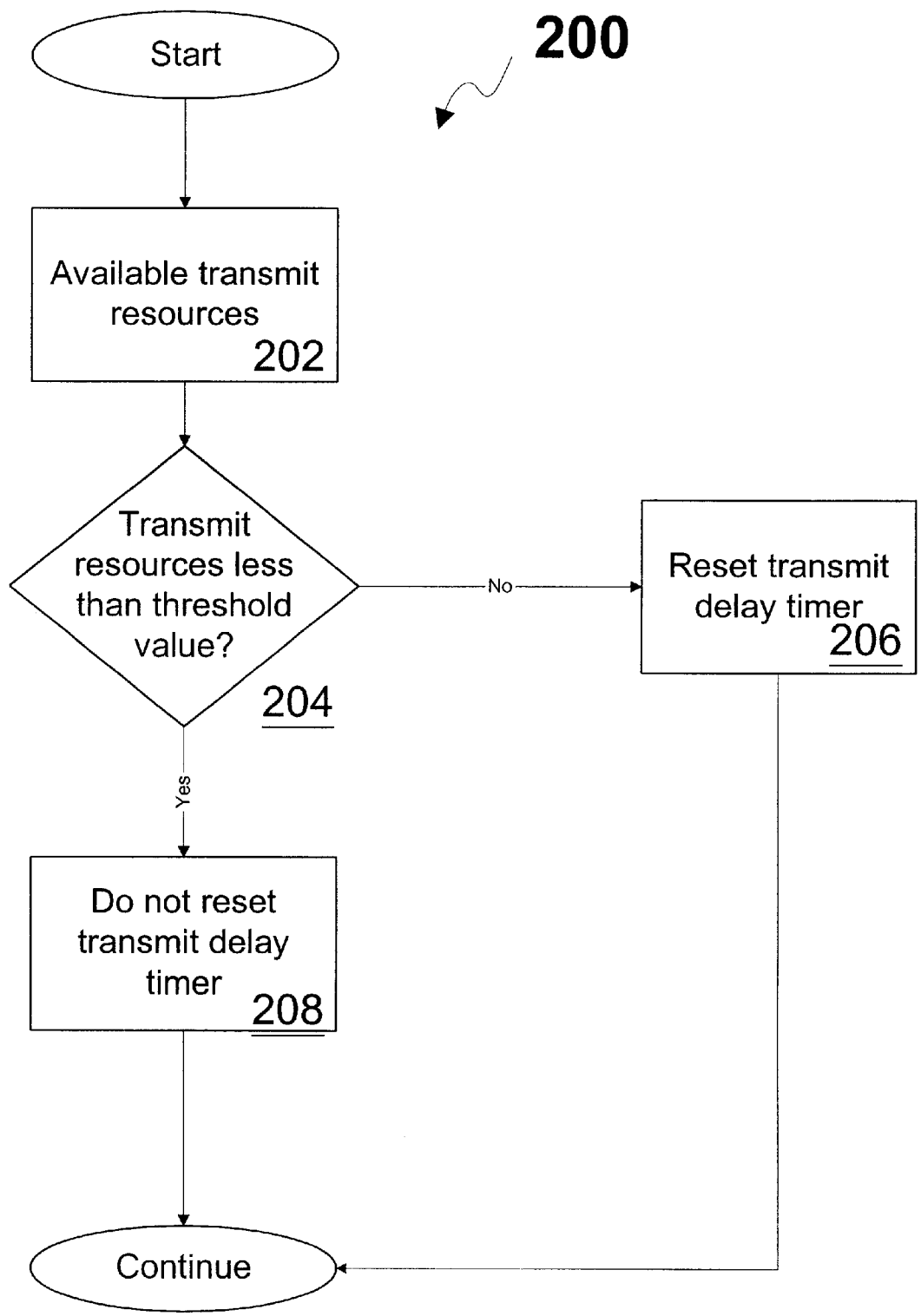
FIG. 2 is a flowchart illustrating one embodiment of a method for operating a network controller.

FIG. 2 illustrates one possible embodiment of the claimed subject matter. 200 is flowchart illustrating an embodiment of a transmit execution flow in accordance with the claimed subject matter. 204 is a comparison block that represents a comparison that may be performed by an I/O device in accordance with the claimed subject matter. A comparison is made between available transmit resources and a threshold value, and if the resources available are less than the data threshold, 208 resolves that the transmit delay timer is not reset, and is allowed to expire. If, however, the available transmit resources are not less than the threshold value, 206 resolves that the transmit delay timer is reset. Subsequent to this comparison, item 210 continues the process and when additional transmit resources are prepared by the I/O device, in this particular illustration, 200 is again initiated. As stated previously, the threshold value may be determined by a number of methods, and still be in accordance with the claimed subject matter.

Figure 4:
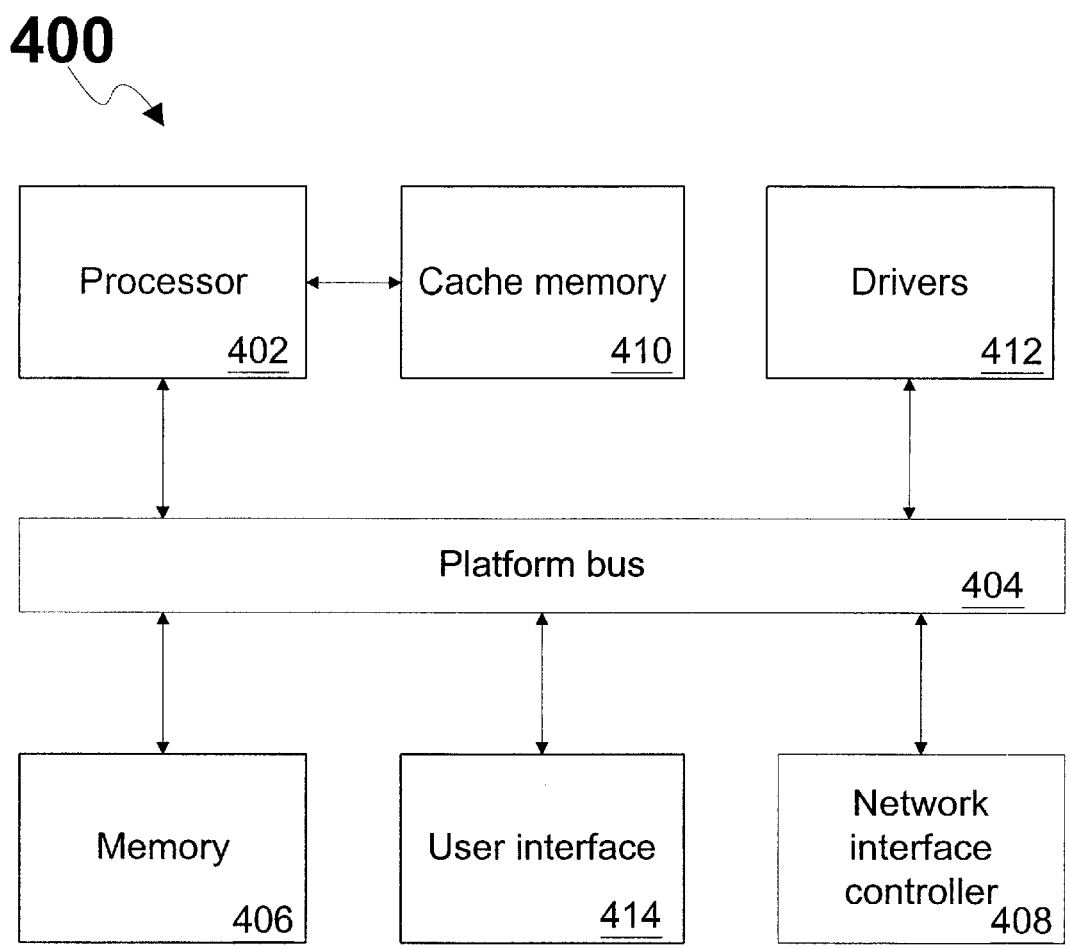
FIG. 4 is a schematic diagram of a computing platform.

Embodiments of the claimed subject matter may be implemented in hardware or software, or a combination of both. Embodiments of the claimed subject matter may be implemented as a computer program executing on a computing system, comprised of at least one processor, a data storage system, which includes volatile and non-volatile memory and/or storage elements, at least one input device, and at least one output device. FIG. 4 is a block diagram of such a system 400. System 400 includes a processor 402 that processes data signals, and may comprise, for example, a PENTIUM®III or PENTIUM® 4 microprocessor available from Intel Corporation. Processor 402 may be coupled to a processor bus 404 that transmits data signals between processor 402 and other components in the system 400. System 400 includes a memory 406. Memory 406 may store instructions and/or data represented by data signals that may be executed by processor 402. The instructions and/or data may comprise code for performing any and/or all of the techniques of the claimed subject matter. Memory 406 may also contain additional software and/or data in accordance with this embodiment, including device drivers for associated components. Software alternatively may be stored on a data storage device 412, such as, for example, floppy disk drive, read only memory (ROM), CD-ROM device, flash memory device, digital versatile disk (DVD), or other storage device. A cache memory 410 may reside inside processor 402 that stores data signals stored in memory 406. A network controller 408 or other I/O device may be coupled to the processor bus 404. A user interface 414 may be coupled to the processor bus 404, and typically will allow a user to gain access to one or more components of system 400. For purposes of the claimed subject matter, a processing system includes any system that has a processor, such as, for example, a digital signal processor (DSP), a microcontroller, an application specific integrated circuit (ASIC), or a microprocessor.

While certain features of the claimed subject matter have been illustrated as described herein, many modifications, substitutions, changes, and equivalents will now occur to those skilled in the art. It is, therefore, to be understood that the appended claims are intended to cover all such embodiments and changes as fall within the true spirit of the claimed subject matter.

What is claimed is:

1. An apparatus comprising:
   an input/output (I/O) device;
   said I/O device is capable of being coupled to a computing system, wherein said I/O device is configured such that, in operation, said I/O device has the capability to interrupt an associated computing system processor based at least in part on a comparison of a threshold value with the quantity of transmit resources available to said I/O device.

2. The apparatus of claim 1, wherein said I/O device is further configured to compare said quantity of transmit resources to said threshold value.

3. The apparatus of claim 1, wherein said I/O device is configured to interrupt said associated computing system processor if said quantity of transmit resources available is less than said threshold value.

4. The apparatus of claim 1, wherein said I/O device comprises a network interface device.

5. The apparatus of claim 4, wherein said I/O device is configured to operate in a Network Device Interface Specification (NOIS) compliant environment.

6. The apparatus of claim 1, wherein said I/O device is configured to receive said threshold value from a user interface.

7. The apparatus of claim 1, wherein said I/O device is configured to set said threshold value based at least in part on the quantity of transmit resources available to said I/O device.

8. The apparatus of claim 1, wherein said I/O device is configured to set the threshold value based at least in part on the type of said I/O device.

9. The apparatus of claim 1, wherein said I/O device is configured to receive information about data traffic patterns, and said I/O device is configured to set said threshold value based at least in part on said data traffic patterns.

10. A method of managing network transmit resources comprising:
    preparing a data fragment for transfer from the memory of a computing platform to an I/O device;
    comparing the number of transmit resources available to a threshold value; and
    instructing an I/O device to generate an interrupt based at least in part on said comparison.

11. The method of claim 10, wherein said interrupt comprises a processor interrupt.

12. The method of claim 11, wherein said processor is interrupted if the quantity of transmit resources available is are less than said threshold value.

13. The method of claim 10, wherein said I/O device comprises a Network Interface Card (NIC).

14. The method of claim 13, wherein said NIC operates in a Network Device Interface Specification (NDIS) environment.

15. The method of claim 10, wherein said threshold value is determined by a user.

16. The method of claim 10, wherein said threshold value is determined by a said device driver.

17. The method of claim 10, wherein said threshold value is based at least in part on the type of I/O device.

18. The method of claim 10, wherein said threshold value is based at least in part on data traffic patterns.

19. An article comprising:
    a storage medium;
    said storage medium having stored thereon instructions, that when executed, result in the following method being performed: preparing a data fragment for transfer from the memory of a computing platform to an I/O device; comparing the number of transmit resources available to a threshold value, and generating an interrupt based at least in part on said comparison.

20. The article of claim 19, wherein said instructions, when executed, further result in generating an interrupt comprising generating a processor interrupt.

21. The article of claim 19, wherein said instructions, when executed, further result in generating an interrupt if the quantity of transmit resources available is are less than said threshold value.

22. The article of claim 19, wherein said instructions, said I/O device comprises a Network Interface Card (MC).

23. The article of claim 19, wherein said instructions, when executed, further result in said I/O device operating in a Network Device Interface Specification (NDIS) environment.

24. The article of claim 19, wherein said threshold value is determined by a user.

25. The article of claim 19, wherein said threshold value is determined by said device driver.

26. The article of claim 19, wherein said threshold value is determined based at least in part on the type of I/O device.

27. The article of claim 19, wherein said threshold value is based at least in part on data traffic patterns.

* * * * *

UNITED STATES PATENT AND TRADEMARK OFFICE
CERTIFICATE OF CORRECTION

PATENT NO. : 6,779,054 B2
DATED : August 17, 2004
INVENTOR(S) : Campbell et al.

It is certified that error appears in the above-identified patent and that said Letters Patent is hereby corrected as shown below:

Column 8,
Line 15, before "less" delete "are".
Line 24, after "a" delete "said".
Line 43, after "is" delete "are".
Line 45, after "wherein" delete "said instructions,".
Line 56, after "is" delete "determined".

Signed and Sealed this

Twenty-sixth Day of July, 2005

JON W. DUDAS
*Director of the United States Patent and Trademark Office*